(12) United States Patent
Van Beckhoven et al.

(10) Patent No.: US 7,716,418 B2
(45) Date of Patent: May 11, 2010

(54) METHOD AND DEVICE FOR UTILIZING A MODIFIED READ-AHEAD COMMAND TO STORE DATA ON A RECORD MEDIUM

(75) Inventors: Stephanus Josephus Maria Van Beckhoven, Eindhoven (NL); Robert Albertus Brondijk, Eindhoven (NL); Pope Ijtsma, Eindhoven (NL); Joze Geelen, Eindhoven (NL); Hiroki Ohira, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 437 days.

(21) Appl. No.: 11/575,575

(22) PCT Filed: Sep. 20, 2005

(86) PCT No.: PCT/IB2005/053079

§ 371 (c)(1),
(2), (4) Date: Mar. 20, 2007

(87) PCT Pub. No.: WO2006/035352

PCT Pub. Date: Apr. 6, 2006

(65) Prior Publication Data

US 2008/0098199 A1    Apr. 24, 2008

(30) Foreign Application Priority Data

Sep. 28, 2004    (EP) .................................. 04104705

(51) Int. Cl.
*G06F 13/00*    (2006.01)
(52) U.S. Cl. ................... 711/111; 711/151; 711/154; 711/213
(58) Field of Classification Search ................ 711/111, 711/151, 154, 213
See application file for complete search history.

(56) References Cited

U.S. PATENT DOCUMENTS

| | | | |
|---|---|---|---|
| 5,557,767 | A | 9/1996 | Sukegawa |
| 5,940,351 | A | 8/1999 | Fujinami et al. |
| 6,092,154 | A | 7/2000 | Curtis et al. |

(Continued)

FOREIGN PATENT DOCUMENTS

EP    1320035    6/2003

OTHER PUBLICATIONS

McFerrin B; "Information Technology—Multimedia Commands—4 (MMC-4), Revision 3D", Incits Working Draft T10/1545-D, Online 2004, XP002357139. Retrieved from the Internet: URL:http://www.t10.org/ftp/t10/drafts/mmc4/mmc4r03d.pdf>.

(Continued)

*Primary Examiner*—Reba I Elmore (57) ABSTRACT

A modified read-ahead (i.e., jump) command, contains a sequential access parameter SAP, JUMPm(X,Y:SAP), for instructing a disc drive to jump to block Y after having read block X. If the SAP parameter has a value indicating that a host, such as a PC, designed to recognize the SAP parameter, deliberately signals a disc drive to jump to a lower address (e.g., Y<X), a disc drive designed in accordance with the present invention will comply. A disc drive not designed to recognize the modified read-ahead command may ignore the SAP parameter. A host not designed to recognize the modified read-ahead command is not capable of setting the SAP parameter.

16 Claims, 4 Drawing Sheets

U.S. PATENT DOCUMENTS

| | | | | |
|---|---|---|---|---|
| 6,138,147 | A | * | 10/2000 | Weaver et al. ............... 709/206 |
| 6,185,621 | B1 | * | 2/2001 | Romine ...................... 709/231 |
| 6,260,143 | B1 | | 7/2001 | DeCarmo |
| 6,381,404 | B1 | | 4/2002 | DeCarmo |
| 6,484,235 | B1 | * | 11/2002 | Horst et al. ................. 711/114 |
| 6,578,070 | B1 | * | 6/2003 | Weaver et al. ............... 709/206 |
| 2003/0210617 | A1 | * | 11/2003 | Millikan et al. .......... 369/30.23 |
| 2004/0049640 | A1 | | 3/2004 | So et al. |

OTHER PUBLICATIONS

Written Opinion of The International Searching Authority PCT/ 1B2005/053079.

* cited by examiner

Table 55 – SET READ AHEAD Command Descriptor Block

| Byte \ Bit | 7 | 6 | 5 | 4 | 3 | 2 | 1 | 0 |
|---|---|---|---|---|---|---|---|---|
| 0 | Operation Code (A7h) |||||||| 
| 1 | Reserved ||||||| NSA |
| 2 | (MSB) Trigger Logical Block Address |||||||| 
| 3 | ||||||||
| 4 | ||||||||
| 5 | (LSB) ||||||||
| 6 | (MSB) Read Ahead Logical Block Address |||||||| 
| 7 | ||||||||
| 8 | ||||||||
| 9 | (LSB) ||||||||
| 10 | Reserved |||||||| 
| 11 | Control ||||||||

METHOD AND DEVICE FOR UTILIZING A MODIFIED READ-AHEAD COMMAND TO STORE DATA ON A RECORD MEDIUM

FIELD OF THE INVENTION

The present invention relates in general to the field of storing data on a record medium. The present invention relates particularly to the field of optical storage, such as CD, DVD, BluRay, and the invention will be explained hereinafter for the case of BluRay, but it is to be noted that this is by way of example only and is not intended to restrict the scope of the invention. The gist of the present invention is also applicable to other types of recordable discs, either optical or not, and the gist of the present invention is even applicable to recordable media other than disc type.

BACKGROUND OF THE INVENTION

Since the technology of optical data storage is general, including the way in which information can be stored in an optical disc, is commonly known, it is not necessary here to explain this technology in great detail. It is briefly summarized that an optical storage disc comprises at least one track, either in the form of a continuous spiral or in the form of multiple concentric circles, of storage space where information may be stored in the form of a data pattern. The storage space is divided into blocks. The data to be written is organized into data sectors, each sector comprising a user data portion and a header portion. A data sector is written into a storage block.

For writing information into the storage space of the optical storage disc, or for reading information from the storage space of the optical storage disc, the storage track is scanned by an optical beam, typically a laser beam. The actual handling of the storage disc is performed by an apparatus that will be indicated as disc drive apparatus. This handling includes the functions of receiving, holding, and rotating the disc. This handling also includes the functions of generating the laser beam(s); directing, focussing and displacing the laser beam(s); suitably modulating the laser beam(s) for writing; sensing the reflected beam(s) for reading. This handling also includes the functions of error correction, deciding which information to write at which physical addresses, etc.

The above-mentioned general functions of the disc drive apparatus are known per se. The present invention is not aiming at improving these general functions; in fact, the present invention may be implemented while using the general functions according to the state of the art. Therefore, a more detailed description and explanation of these general functions is omitted here. It suffices to say that the disc drive apparatus has a data input for receiving data-to-be-stored, and a data output for outputting data-read-from-disc.

Typically, apart from an optical disc as a record medium and a disc drive apparatus for handling the disc, an optical storage system comprises a host apparatus. The host apparatus, which may be a PC running a suitable program, or an application of a consumer apparatus such as a video recorder, is a device which communicates with the disc drive, sending data and commands to the disc drive instructing the disc drive to write the data to a certain storage location, or sending commands to the disc drive instructing the disc drive to read data from a certain storage location, and receiving data from the disc drive. For the purpose of explaining the present invention, it is immaterial what the host intends to do with the data. It suffices to say that the host apparatus has a data input for receiving data-read-from-disc, and a data output for outputting data-to-be-stored. It is to be noted that, when sending data to the disc drive, the host already sends the data in the form of sectors.

When a storage system is operating in write mode, the disc drive can only perform the actual write operation after having received a sector from the host. This restriction does not apply in the case of a storage system operating in read mode: while one sector is being communicated to the host, the disc drive is free to already read a next sector. This feature allows for a streaming read process, i.e. a continuous flow of data to the host, which is especially important in the case of, for instance, audio or video being reproduced from disc.

Usually, audio and video is also written in a streaming process, and the disc drive usually writes the disc in a sequential process, i.e. when a block is full, writing continues at the beginning of the next following block. Based on this fact, a disc drive is designed to operate in a sequential read mode, where blocks are read in a sequential manner. In other words, when a block has been read completely, reading continues automatically at the beginning of the next following block. Such mode of operation is based on the assumption that this block actually is the next block which the host wants to read: this is called "sequential access by the host". So, normally, there may be a relatively large distance between the block currently being read by a disc drive and the block currently being transferred to the host. The blocks in-between are stored in a block buffer of the disc drive.

In the following, the address of a block which is currently being read by a disc drive will be indicated as Read Block Address RBA, while the address of a block whose data is currently being transferred to the host will be indicated as Transfer Block Address TBA. The distance between RBS and TBA will be indicated as Block Ahead Distance BAD. In practice, BAD can be as high as the entire length of a track.

Usually, information is stored sequentially, indeed, and the sequential read mode is actually the correct way of reading data. However, it may happen that the host intends to make a jump thus terminating its sequential access. In order to assure the streaming read process, the host is capable of signalling to the drive his intention to jump, so that the disc drive can already perform the jump and start reading before the host actually requires the data from the jumped location.

This signalling is executed by the host sending a so-called "set-read-ahead" command. This command typically has the format JUMP(X,Y) containing two parameters X and Y which indicate block addresses of jump-start and jump-end, respectively. For the host, this command has the meaning of saying: "I shall continue to give sequential read commands until I have finished reading block X; then, I shall wish to continue reading at block Y." For the disc drive, this command has the following meaning: "I shall continue to sequentially read blocks and store their contents in my buffer, until I have read and stored block X; then, I shall make a jump to block Y, and I shall sequentially read blocks from Y onwards."

A read-ahead command as described above is known per se. However, when this known command was designed, it was assumed that write jumps would always have been made towards a higher address, so only commands JUMP(X,Y) with Y>X were to be expected. Current disc drives are programmed to ignore a read-ahead command JUMP(X,Y) with Y<X, and/or to issue an error message to the host, under the assumption that the host has made a mistake or that the command has been corrupted in some way. This constitutes a problem, especially in the case of BD video recorders, where the data can actually be fragmented and scattered over the entire disc.

Accordingly, an important objective of the present invention is to overcome the above problems.

Particularly, it is an objective of the present invention to provide a modified read-ahead command JUMPm(X,Y) with Y<X in such a way that a disc drive modified in accordance with the present invention will jump back from X to Y only when the command originates from a host modified in accordance with the present invention. If the host is designed in accordance with prior art, i.e. not modified in accordance with the present invention, the disc drive should behave as before, i.e. ignore the command JUMP(X,Y<X) and/or issue an error message to the host.

SUMMARY OF THE INVENTION

According to an important aspect of the present invention, a read-ahead command contains a sequential access parameter SAP, which may be implemented by one bit. If the sequential access parameter has a value indicating that the host deliberately signals a jump to a lower address (i.e. the host is designed in accordance with the present invention and knows what it is doing), a disc drive designed in accordance with the present invention will comply. A disc drive not designed in accordance with the present invention may ignore the sequential access parameter. A host not designed in accordance with the present invention is not capable of setting the sequential access parameter.

BRIEF DESCRIPTION OF THE DRAWINGS

These and other aspects, features and advantages of the present invention will be further explained by the following description with reference to the drawings, in which same reference numerals indicate same or similar parts, and in which.

DESCRIPTION OF THE INVENTION

Figure 1:
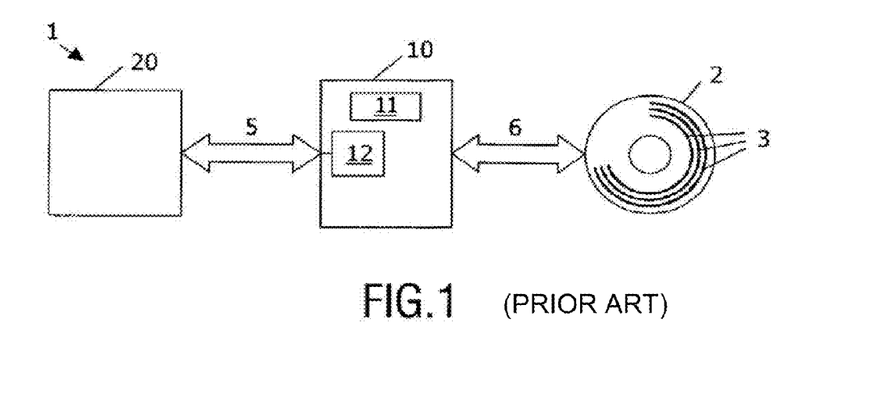
FIG. 1 is a block diagram schematically illustrating a data storage system.

FIG. 1 is a block diagram schematically illustrating a data storage system 1, comprising a data storage medium 2, a medium access device 10, and a host device 20. In a typical practical implementation, the host device 20 may be a suitably programmed personal computer (PC); it is also possible that the data storage system 1 is implemented as a dedicated user apparatus such as a video recorder, in which case the host device 20 is the application part of such apparatus. In a specific embodiment, the data storage medium 2 is implemented as an optical disc, for instance a DVD or a BD, in which case the medium access device 10 is implemented as a disc drive. In the following, the invention will be described specifically for an optical disc implementation, but it is noted that the present invention is not limited to optical discs.

The optical disc 2 has a storage space 3, which has the form of one or more continuous spiral-shaped tracks or one or more tracks in the form of multiple concentric circles, where information can be stored in the form of a data pattern. Since this technology is commonly known to persons skilled in the art, this technology will not be explained in further detail.

In FIG. 1, a host/drive communication link between host device 20 and disc drive 10 is indicated at 5. Likewise, a drive/disc communication link between disc drive 10 and disc 2 is indicated at 6. The drive/disc communication link 6 represents the physical (optical) read/write operation as well as the physical addressing of blocks 4 of the storage space 3. The host/drive communication link 5 represents a data transfer path as well as a command transfer path.

Figure 2:
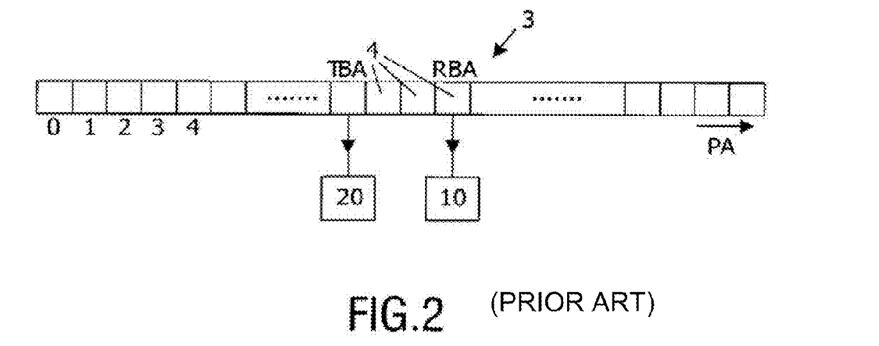
FIG. 2 is a diagram schematically depicting the block structure of the storage space of a storage medium.

FIG. 2 is a diagram schematically illustrating that the storage space 3 is divided into a large number of blocks 4. Each block has a specific physical address PA. When the host device 20 wants to access a certain piece of information, it sends a request to the disc drive 10, indicating the corresponding logical address LA. The disc drive 10 comprises a memory 11, which contains information regarding the relationship between logical addresses LA and physical addresses PA, for instance in the form of a look-up table. Based on this information, the disc drive 10 determines which physical address corresponds to the required logical address.

FIG. 2 illustrates a typical situation during a reading process. The host 20 is receiving information from a first block having a Transfer Block Address TBA, while the disc drive 10 is already some blocks further, reading the data from a second block having a Read Block Address RBA. It should be understood that the host 20 is not accessing the first block TBA directly, as the figure suggests, but the host 20 receives the data from a data buffer 12 of the disc drive 10.

Figure 3A:
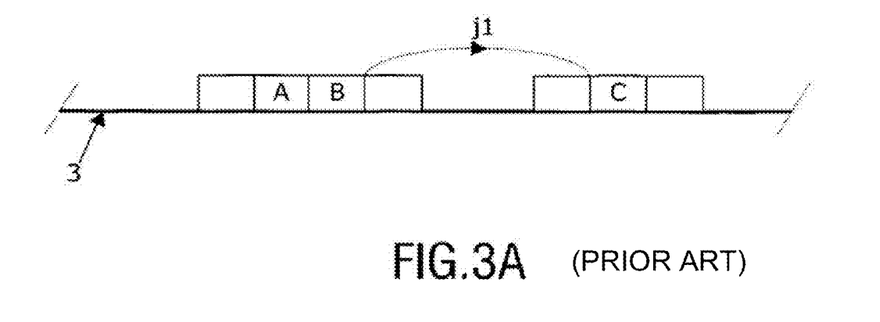
FIG. 3A is a diagram schematically depicting a read order in the case of a forward jump.

FIG. 3A is a diagram schematically illustrating that sectors of a data sequence are not always written in a physically sequential order. In the illustration of FIG. 3A, a data sequence (for instance a video sequence) comprises sectors A, B, C, which need to be accessed in this order. Assume a host reading the first sector A. Next sector B is the first block after sector A, but third sector C is not located adjacent second sector B, so a jump j1 has to be made. In this case, the jump j1 from second sector B to third sector C is a jump to a higher address.

It is noted that the track 3 main contain one or more further sectors between sectors B and C, as illustrated, but the storage space between sectors B and C may also be empty.

Figure 3B:
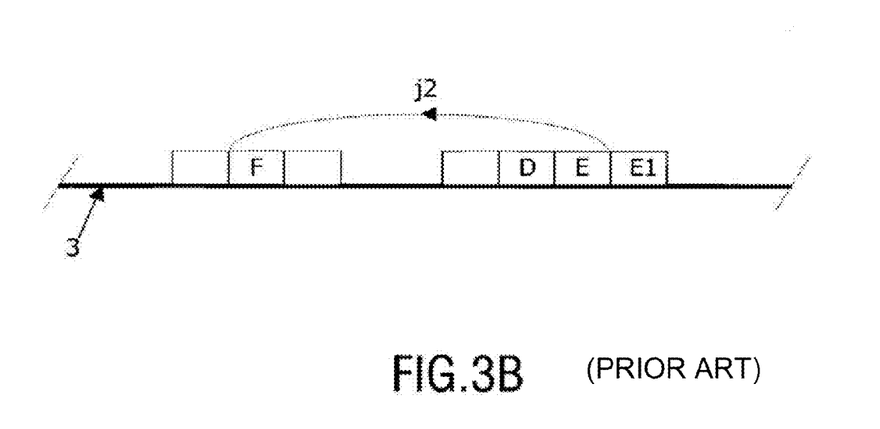
FIG. 3B is a diagram schematically depicting a read order in the case of a backward jump.

FIG. 3B is a diagram comparable to FIG. 3A, illustrating a data sequence (for instance a video sequence) comprising sectors D, E, F, which need to be accessed in this order. Assume a host reading the first sector D. Next sector E is the first block after sector A, but third sector C is not located adjacent second sector B, so a jump j2 has to be made. In this case, the jump j2 from second sector E to third sector F is a jump to a lower address. It is noted that the track 3 main contain one or more further sectors between sectors F and D, as illustrated, but the storage space between sectors B and C may also be empty.

In order for the disc drive 10 to maintain its advance with respect to the host 20, the disc drive 10 should also make such jumps j1, j2. However, the disc drive 10 does not know that the host 10 will make such jumps, so this information should be communicated from the host to the drive.

For instance, at any time during the reading process of sectors A and B, the host 20 can send to the disc drive 10 a "read-ahead" command JUMP(B,C). This command is known in the state of the art: in response to this command, since the address of C is higher than the address of B, the disc drive 10 will jump to sector C when it has completely read sector B.

It is noted that, although in this example sectors A and B are adjacent to each other, the sequence may comprise further sectors between sectors A and B, and the "read-ahead" command JUMP(B,C) may be given at any time before completing the reading of sector B.

Likewise, the host knows that after sector E it will want to make a jump back to sector F. Thus, the host 20 will issue a "read-ahead" command JUMP(E,F). In this case, however, since the address of F is lower than the address of E, a prior art disc drive 10 will ignore this command and will return an error message to the host 20. So, the prior art disc drive will continue reading sector E1 next to sector E. When the host 20 has actually received all information of the third sector E, it will request the disc drive to read sector F. The disc drive 10 will then first have to make a jump to the required track, which takes time, so a continuous data flow may be impossible.

It is noted that, although in this example sectors D and E are adjacent to each other, the sequence may comprise further sectors between sectors D and E, and the "read-ahead" command JUMP(E,F) may be given at any time before completing the reading of sector B.

According to the invention, the host sends a modified "set-read-ahead" command, indicated as JUMPm(X,Y), which causes the disc drive 10 to perform the jump, even to a lower address.

There are several practical possibilities envisaged for implementing the modified "set-read-ahead" command JUMPm(X,Y). First, it is of course possible to define an entirely new command. However, it is easier to adapt existing commands of an existing command set. An example of a widely used command set is indicated as MMC3, also indicated as "Mount Fuji" (see, for instance, www.t10.org: "Multimedia Command Set Version 3 Revision 10G"). In the following, an example of a suitable modified "set-read-ahead" command JUMPm(X,Y) will be described.

Figure 4:
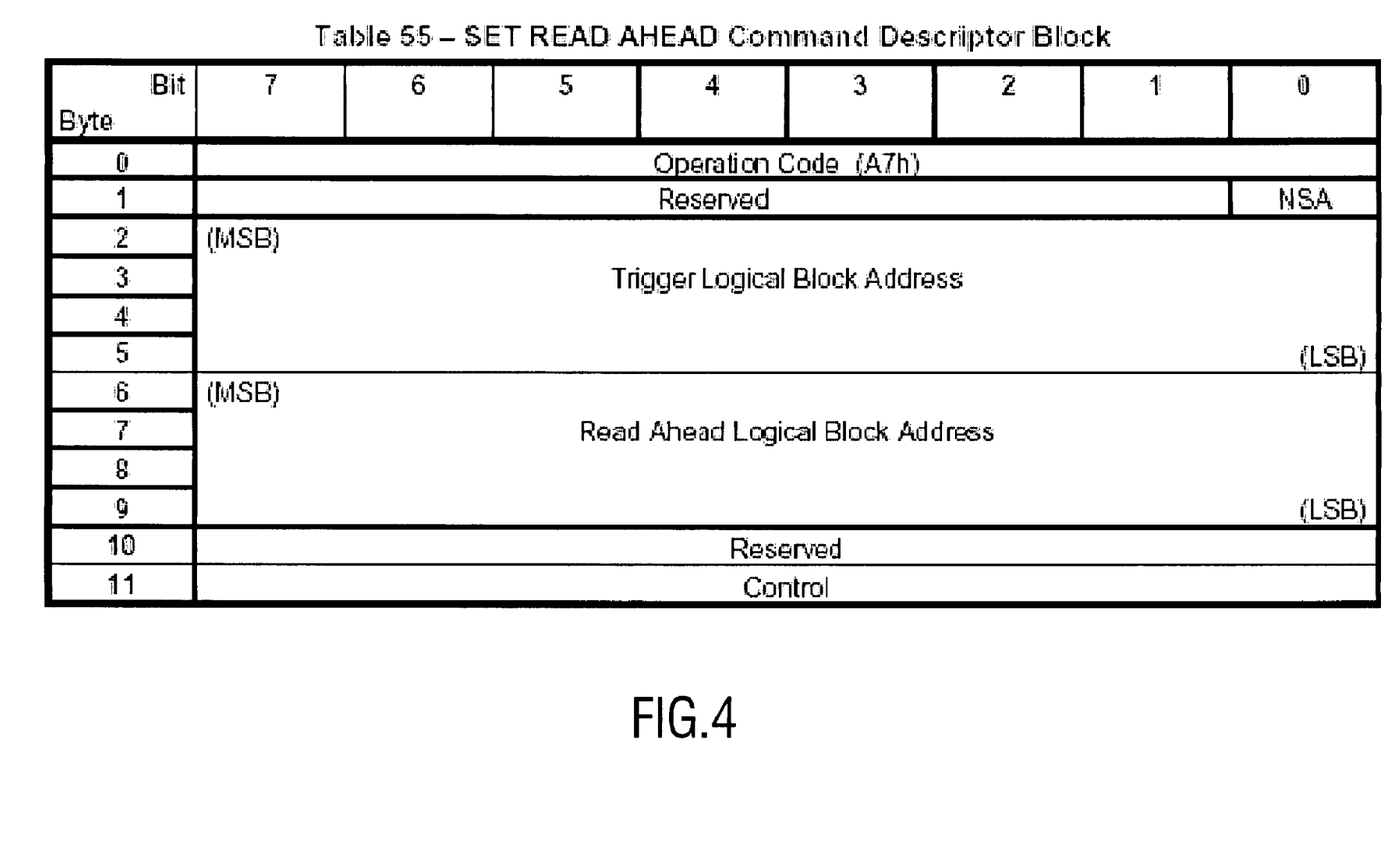
FIG. 4 is a table illustrating a SET-READ-AHEAD command descriptor block of a read command suitable for use in a read method in accordance with the present invention.

FIG. 4 is a table illustrating a SET READ AHEAD command descriptor block, adapted in accordance with the present invention to comprise a sequential access parameter SAP; therefore, this command will hereinafter also be indicated as JUMPm(X,Y;SAP). It is noted that the sequential access parameter SAP may comprise more than one bit, but one bit suffices.

As illustrated by the table in FIG. 4, the SET READ AHEAD command comprises 12 bytes of 8 bits each. Byte 0 contains an operation code, bytes 2-5 are used to indicate the logical block address of the sector from where a jump is to be made (i.e. X), and bytes 6-9 are used to indicate the logical block address of the sector where the jump should end (i.e. Y). Byte 11 is a control byte.

Bytes 1 and 10 are reserved for later definition, i.e. they do not have a defined meaning yet. So, it is possible to use any bit of these bytes as a sequential access parameter SAP.

In the embodiment as illustrated in FIG. 4, the first bit 0 of the second byte 1 is used as sequential access parameter SAP.

A host 20 that is not designed in accordance with the present invention will not set this SAP bit; therefore, such host will always issue a command JUMPm(X,Y;0). A host 20 designed in accordance with the present invention may always issue a command JUMPm(X,Y;1). For jumps to a higher address, the host may issue a command JUMPm(X,Y>X;0), but in any case, for jumps to a lower address, the host will always issue a command JUMPm(X,Y<X;1).

A disc drive 10 that is not designed in accordance with the present invention will not consider the SAP bit, and will behave as before: only commands of type JUMPm(X,Y>X;0) or JUMPm(X,Y>X;1) will be executed, whereas commands of type JUMPm(X,Y<X;0) or JUMPm(X,Y<X;1) will result in an error message.

A disc drive 10 designed in accordance with the present invention will consider the SAP bit. In case SAP=0, commands of type JUMPm(X,Y>X;0) will be executed, whereas commands of type JUMPm(X,Y<X;0) will result in an error message. In case SAP=1, all commands of type JUMPm(X,Y;1) will be executed, whether Y>X or Y<X.

Figure 5:
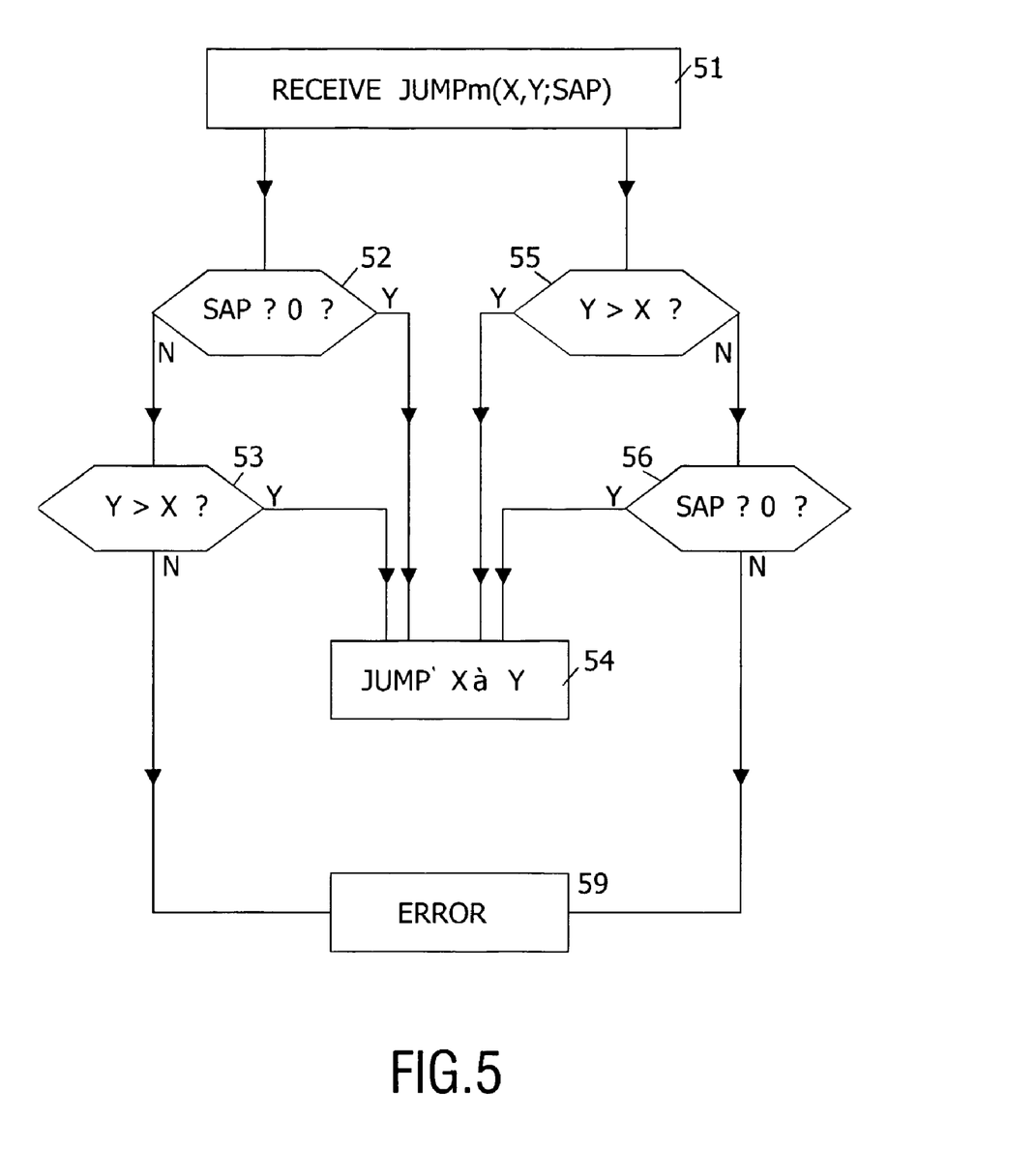
FIG. 5 is a flow diagram schematically illustrating a process of decision-making in a disc drive.

It is noted that it is not necessary for the disc drive 10 to consider the SAP bit in case Y>X. FIG. 5 illustrates different possibilities for the disc drive 10 for executing a decision-making process 50 when receiving a jump command JUMPm(X,Y;SAP) [step 51].

First, it is possible that the disc drive 10 considers whether SAP≠0 [step 52]; if so, the disc drive 10 does not need to compare X and Y but can make the jump X→Y in any case [step 54]. Otherwise, if SAP=0, the disc drive 10 compares X and Y to check whether Y>X [step 53]; if so, the disc drive 10 can make the jump X→Y [step 54], otherwise it issues an error message [step 59].

Alternatively, it is possible that the disc drive 10 first compares X and Y to check whether Y>X [step 55]; if so, the disc drive 10 does not need to consider the SAP bit but can make the jump X→Y in any case [step 54]. Otherwise, if Y<X, the disc drive 10 considers whether SAP≠0 [step 56]; if so, the disc drive 10 can make the jump X→Y [step 54], otherwise it issues an error message [step 59].

Thus, it should be clear that the present invention succeeds in providing a data storage system 1 which comprises:

an optical disc 2 having a storage space 3 comprising blocks 4 of storage locations;

a disc drive 10, suitable for reading information from the disc, the drive being designed to automatically start reading a next block after having read a previous block;

a host 20, capable of cooperating with the drive;

the host being designed to send commands to said drive, commanding said drive to read one or more sectors of data from said disc 2;

the host being designed to send a jump command JUMPm(X,Y;SAP) to said drive, for instructing said drive to jump to block Y after having read block X, the jump command JUMPm(X,Y;SAP) including a sequential access parameter SAP;

the drive being designed, in response to receiving a jump command JUMPm(X,Y<X;SAP≠0), to jump back to block Y after having read block X, the address of block Y being lower than the address of block X.

It should be clear to a person skilled in the art that the present invention is not limited to the exemplary embodiments discussed above, but that several variations and modifications are possible within the protective scope of the invention as defined in the appending claims.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. Host device (20), capable of cooperating with a medium access device (10) suitable for reading information from a storage medium (2) which has a storage space (3) comprising blocks (4) of storage locations having addresses (PA), the medium access device (10) being of a type which automatically starts reading a next block after having read a previous block;

the host device (20) being designed to send (5) commands to the medium access device (10), commanding the medium access device (10) to read one or more sectors of data from the storage medium (2);

the host device (20) being designed to send a jump command JUMPm(X,Y;SAP) to the medium access device (10), for instructing the medium access device (10) to jump to block Y after having read block X, the jump command JUMPm(X,Y;SAP) including a sequential access parameter SAP;

the host device being designed to set the sequential access parameter to one of a first or second value:

a) in the case where the sequential access parameter SAP is set by the host device (20) to a first value to indicate to the medium access device (10) that the host device (20) deliberately signals a jump from a lower addressable block X to a higher addressable block Y, the medium access device (20) executes the jump command JUMPm(X,Y;SAP) by jumping from the lower addressable block X to the higher addressable block Y, (X<Y), and b) in the case where the sequential access parameter SAP is set by the host device (20) to a second value to indicate to the medium access device (10) that the host device (20) deliberately signals a jump from a higher addressable block X to a lower addressable block Y, the medium access device (20) executes the jump command JUMPm(X,Y;SAP) by jumping from the higher addressable block X to the lower addressable block Y, (X>Y)

iii) in a case where the medium access device (20) is not designed to recognize the jump command JUMPm(X,Y;SAP):

the medium access device (20) ignores the setting of the SAP parameter and execute the jump command JUMPm(X,Y;SAP) by jumping from the lower addressable block X to the higher addressable block Y, (X<Y), the medium access device (20) returns an error message in response to the jump command JUMPm(X,Y;SAP) when it is instructed to jump from the higher addressable block X to the lower addressable block Y, (X>Y).

2. Host device according to claim 1, designed to always set the sequential access parameter SAP≠0.

3. Host device according to claim 1, designed to always set the sequential access parameter SAP to have a first value if Y>X and to have a second value differing from the first value if Y<X.

4. Host device according to claim 3, wherein the first value is zero.

5. Host device according to claim 1, wherein the sequential access parameter SAP contains only one bit.

6. Host device according to claim 1, adapted to send said jump command as a modified SET-READ-AHEAD command.

7. Host device according to claim 6, wherein the first bit of the second byte of the modified SET-READ-AHEAD command is used as sequential access parameter SAP.

8. Medium access device (10), suitable for reading information from a storage medium (2) which has a storage space (3) comprising blocks (4) of storage locations having addresses (PA), the medium access device (10) being designed to automatically start reading a next block after having read a previous block;

the medium access device (10) being designed to receive (5) from a host device (20) a jump command JUMPm(X,Y;SAP) including a sequential access parameter SAP;

the medium access device (10) being designed, in response to receiving said jump command JUMPm(X,Y;SAP), to jump to block Y after having read block X;

the host device being designed to set the sequential access parameter to one of a first or second value:

a) in the case where the sequential access parameter SAP is set by the host device (20) to a first value to indicate to the medium access device (10) that the host device (20) deliberately signals a jump from a lower addressable block X to a higher addressable block Y, the medium access device (20) executes the jump command JUMPm(X,Y;SAP) by jumping from the lower addressable block X to the higher addressable block Y, (X<Y), and b) in the case where the sequential access parameter SAP is set by the host device (20) to a second value to indicate to the medium access device (10) that the host device (20) deliberately signals a jump from a higher addressable block X to a lower addressable block Y, the medium access device (20) executes the jump command JUMPm(X,Y;SAP) by jumping from the higher addressable block X to the lower addressable block Y, (X>Y)

iii) in a case where the medium access device (20) is not designed to recognize the jump command JUMPm(X,Y;SAP):

the medium access device (20) ignores the setting of the SAP parameter and execute the jump command JUMPm(X,Y;SAP) by jumping from the lower addressable block X to the higher addressable block Y, (X<Y), the medium access device (20) returns an error message in response to the jump command JUMPm(X,Y;SAP) when it is instructed to jump from the higher addressable block X to the lower addressable block Y, (X>Y).

9. Medium access device according to claim 8, adapted to execute commands of type JUMPm(X,Y<X;SAP≠0).

10. Medium access device according to claim 9, adapted to issue an error message in response to receiving commands of type JUMPm(X,Y<X;0).

11. Medium access device according to claim 8, adapted, when receiving said jump command JUMPm(X,Y;SAP), in a first step (52) to determine the value of the sequential access parameter SAP, and to make the jump X→Y in any case if SAP≠0.

12. Medium access device according to claim 11, adapted, when in the first step it appears that SAP=0, in a second step (53) to compare X and Y, and to make the jump X→Y if it appears that Y>X, otherwise preferably to issue an error message.

13. Medium access device according to claim 8, adapted, when receiving said jump command JUMPm(X,Y;SAP), in a first step (55) to compare X and Y, and to make the jump X→Y in any case if Y>X.

14. Medium access device according to claim 13, adapted, when in the first step it appears that Y<X, in a second step (56) to determine the value of the sequential access parameter SAP, and to make the jump X→Y if it appears that SAP≠0, otherwise preferably to issue an error message.

15. Data storage system, comprising:
- a storage medium having a storage space comprising blocks of storage locations having addresses (PA);
- a host device, capable of cooperating with a medium access device suitable for reading information from a storage medium
- a medium access device, suitable for reading information from the storage medium, the medium access device being designed to automatically start reading a next block after having read a previous block;
- i) in a case wherein the host device (20) and the medium access device (20) are designed to recognize the jump command JUMPm(X,Y;SAP):
  - a) the sequential access parameter SAP is set by the host device (20) to a first value to indicate to the medium access device (10) that the host device (20) deliberately signals a jump from a lower addressable block X to a higher addressable block Y, the medium access device (20) executes the jump command JUMPm(X,Y;SAP) by jumping from the lower addressable block X to the higher addressable block Y, (X<Y), and
  - b) the sequential access parameter SAP is set by the host device (20) to a second value to indicate to the medium access device (10) that the host device (20) deliberately signals a jump from a higher addressable block X to a lower addressable block Y, the medium access device (20) executes the jump command JUMPm(X,Y;SAP) by jumping from the higher addressable block X to the lower addressable block Y, (X>Y)
- ii) in a case wherein the host device (20) is designed to recognize the jump command JUMPm(X,Y;SAP) and the medium access device (20) is not designed to recognize the jump command JUMPm(X,Y;SAP):
  - the medium access device (20) ignores the setting of the SAP parameter and execute the jump command JUMPm(X,Y;SAP) by jumping from the lower addressable block X to the higher addressable block Y, (X<Y), and return an error message in response to the jump command JUMPm(X,Y;SAP) when it is instructed to jump from the higher addressable block X to the lower addressable block Y, (X>Y).

16. Data storage system according to claim 15, wherein said storage medium is an optical disc, preferably a CD, a DVD, or a BD, and wherein said medium access device is a disc drive.

* * * * *